United States Patent
Soenen et al.

(10) Patent No.: US 9,776,552 B2
(45) Date of Patent: Oct. 3, 2017

(54) LIGHT MODULE FOR A MOTOR VEHICLE COMPRISING A LIGHT GUIDE

(71) Applicant: Valeo Vision, Bobigny (FR)

(72) Inventors: Xavier Soenen, Angers (FR); Sylvain Giraud, La Fleche (FR); Jerome Chiron, Tierce (FR)

(73) Assignee: Valeo Vision, Bobigny (FR)

( * ) Notice: Subject to any disclaimer, the term of this patent is extended or adjusted under 35 U.S.C. 154(b) by 64 days.

(21) Appl. No.: 14/926,379

(22) Filed: Oct. 29, 2015

(65) Prior Publication Data

US 2016/0121782 A1    May 5, 2016

(30) Foreign Application Priority Data

Nov. 3, 2014    (FR) .................... 14 60544

(51) Int. Cl.
*B60Q 1/00* (2006.01)
*F21S 8/10* (2006.01)
(Continued)

(52) U.S. Cl.
CPC .......... *B60Q 1/0011* (2013.01); *B60Q 1/2607* (2013.01); *B60Q 1/28* (2013.01); *B60Q 1/34* (2013.01); *F21S 48/115* (2013.01); *F21S 48/211* (2013.01); *F21S 48/215* (2013.01); *F21S 48/2206* (2013.01); *F21S 48/2237* (2013.01); *F21S 48/2281* (2013.01);
(Continued)

(58) Field of Classification Search
CPC . G02B 6/0006; G02B 6/0091; F21Y 2113/20; F21Y 2113/13; F21Y 2115/10; B60Q 1/0011; B60Q 1/2607; B60Q 1/28; B60Q 1/34; B60Q 2400/30

USPC .................................................. 362/511, 507
See application file for complete search history.

(56) References Cited

U.S. PATENT DOCUMENTS 6,554,462 B2 * 4/2003 Hulse .................. B60Q 1/0011
362/33
9,039,260 B2   5/2015 Faffelberger
(Continued)

FOREIGN PATENT DOCUMENTS

DE   102008016675 A1   10/2009
EP        2161494 A1    3/2010
(Continued)

*Primary Examiner* — Laura Tso
(74) *Attorney, Agent, or Firm* — Jacox, Meckstroth & Jenkins (57) ABSTRACT

A light module for a motor vehicle comprising:
  a light guide with an input face and at least two branches each extending from the input face according to a specific length and a specific section;
  at least one light source arranged at the input face of the light guide, the input face being adapted to couple light rays emitted by the light source in the light guide;
  wherein the two branches are contiguous over a part of their length from the input face to a determined point of separation, the two sections of the branches overlapping over a zone of intersection which is present from the input face to the determined point of separation. The two sections are substantially constant along the branches from the input face over a length greater than or equal to the length of the branches between the input face and the determined point of separation.

20 Claims, 7 Drawing Sheets

(51) Int. Cl.

| | | |
|---|---|---|
| *B60Q 1/26* | (2006.01) | |
| *B60Q 1/28* | (2006.01) | |
| *B60Q 1/34* | (2006.01) | |
| *F21V 8/00* | (2006.01) | |
| *F21Y 115/10* | (2016.01) | |
| *F21Y 113/13* | (2016.01) | |
| *F21Y 113/20* | (2016.01) | |

(52) U.S. Cl.
CPC ......... *G02B 6/0006* (2013.01); *G02B 6/0091* (2013.01); *B60Q 2400/30* (2013.01); *F21S 48/225* (2013.01); *F21S 48/328* (2013.01); *F21Y 2113/13* (2016.08); *F21Y 2113/20* (2016.08); *F21Y 2115/10* (2016.08)

(56) References Cited

U.S. PATENT DOCUMENTS

| | | | |
|---|---|---|---|
| 9,157,593 | B2 | 10/2015 | Moser et al. |
| 2013/0114277 | A1* | 5/2013 | Faffelberger ............. B60Q 1/04 362/511 |
| 2014/0043843 | A1 | 2/2014 | Moser et al. |
| 2014/0293630 | A1* | 10/2014 | Domini ................. G02B 6/001 362/487 |

FOREIGN PATENT DOCUMENTS

| | | | |
|---|---|---|---|
| EP | 2592333 | | 5/2013 |
| EP | 2620790 | A1 | 7/2013 |
| EP | 2 839 989 | * | 1/2014 |
| JP | 2004348072 | A | 12/2004 |
| JP | 2011175950 | | 9/2011 |
| JP | 2014007014 | | 1/2014 |
| WO | 2012162713 | A1 | 12/2012 |

\* cited by examiner

LIGHT MODULE FOR A MOTOR VEHICLE COMPRISING A LIGHT GUIDE

CROSS-REFERENCE TO RELATED APPLICATIONS

This application claims priority to the French application 1460544 filed Nov. 3, 2014, which application is incorporated herein by reference and made a part hereof.

BACKGROUND OF THE INVENTION

1. Field of the Invention

The present invention relates to a light module for a motor vehicle.

It is applicable particularly but in a nonlimiting manner in lighting devices, such as motor vehicle headlights.

2. Description of the Related Art

A light module for a motor vehicle comprises, as is known to those skilled in the art:

two separate light guides linked by a ribbon cable at the input of the guides, the two guides each extending from the ribbon cable according to a specific length and a specific section;

a plurality of light sources arranged at the ribbon cable.

The ribbon cable makes it possible to fix the two light guides on a housing of a motor vehicle headlight.

The light sources emit white light or amber light to respectively produce a first photometric function or a second photometric function.

One drawback of this prior art is that there are photometric losses due to the ribbon cable at the input of the light guides. Moreover, it is difficult to uniformly distribute the light rays in the two guides and obtain a uniform color to produce the desired photometric function.

In this context, the present invention aims to resolve the drawbacks mentioned previously.

SUMMARY OF THE INVENTION

To this end, the invention proposes a light module for a motor vehicle comprising:

a light guide consisting of an input face and at least two branches each extending from the input face according to a specific length and a specific section;

at least one light source arranged at the input face of the light guide, the input face being adapted to couple the light rays emitted by the light source in the light guide;

in which the two branches are contiguous over a part of their length from the input face to a determined point of separation, the two sections of the branches overlapping over a zone of intersection which is present from the input face to the determined point of separation and the two sections being substantially constant along the branches from the input face over a length greater than or equal to the length of the branches between the input face and the determined point of separation.

Thus, as will be seen later in detail, by eliminating the ribbon cable at the input of the light guide, the photometric losses at the input are a thing of the past. Moreover, by producing a single light guide with two contiguous branches of substantially constant sections it becomes possible to obtain a better distribution of the light rays and of the color in the two branches.

According to nonlimiting embodiments, the light module can further comprise one or more additional features out of the following:

In a nonlimiting embodiment, the two sections are substantially constant over the entire length of said branches.

In a nonlimiting embodiment, the area of the zone of intersection decreases continuously from the input face to the determined point of separation.

In a nonlimiting embodiment, the sections of the branches are tangential at the determined point of separation.

In a nonlimiting embodiment, the sections of the two branches have an identical form.

In a nonlimiting embodiment, the section of a branch is of circular form.

In a nonlimiting embodiment, the section of a branch is of square form.

In a nonlimiting embodiment, the section of a branch is of oblong form.

In a nonlimiting embodiment, the sections of the two branches have the same dimension.

In a nonlimiting embodiment, the light module comprises a plurality of light sources arranged at the input face of the light guide.

In a nonlimiting embodiment, the zone of intersection of the two sections is dimensioned as a function of at least one of the following characteristics:

the arrangement of the light sources at the input face of the light guide;

the size of each light source;

the number of light sources.

In a nonlimiting embodiment, the light sources occupy a surface area which is smaller than the surface area consisting of the two sections of the two branches such that the input face collects all the light rays emitted by the light sources.

In a nonlimiting embodiment, the light sources are arranged on two rows, the light sources of one row being arranged head-to-tail with the light sources of the other row.

In a nonlimiting embodiment, the light sources comprise first sources suitable for emitting white light to produce a first photometric function and second sources suitable for emitting amber light to produce a second photometric function.

In a nonlimiting embodiment, the first sources form a group of sources positioned substantially at the center of the input face and edged on either side by the second sources.

In a nonlimiting embodiment, the first light sources are suitable for emitting white light to produce a third photometric function.

In a nonlimiting embodiment, the light sources are mounted on a common support.

In a nonlimiting embodiment, the at least one light source is a semiconductive emitting chip.

In a nonlimiting variant embodiment, the semiconductive emitting chip is a light-emitting diode.

A lighting device for a motor vehicle is also proposed comprising a light module according to any one of the preceding features, in which the light module further comprises a printed circuit board, and in which the lighting device further comprises a housing comprising a front face on which is arranged the light guide and a rear face on which is arranged the printed circuit board, the rear face comprising:

centering tabs for centering the light guide in the housing; and centering ridges for centering the printed circuit board in the housing.

In a nonlimiting embodiment, the rear face further comprises two fixing clips for immobilizing the light guide in the housing and the light guide comprises two lugs which cooperate with the two fixing clips.

In a nonlimiting embodiment, the lighting device further comprises a heat sink arranged on the side of the rear face of the housing, the printed circuit board being placed between the rear face and the heat sink.

These and other objects and advantages of the invention will be apparent from the following description, the accompanying drawings and the appended claims

BRIEF DESCRIPTION OF THE ACCOMPANYING DRAWINGS

The invention and its various applications will be better understood on reading the following description and studying the accompanying figures.

DETAILED DESCRIPTION OF THE PREFERRED EMBODIMENTS

The elements that are identical, by structure or by function, and that appear in the different figures retain, unless otherwise specified, the same references.

Figure 1:
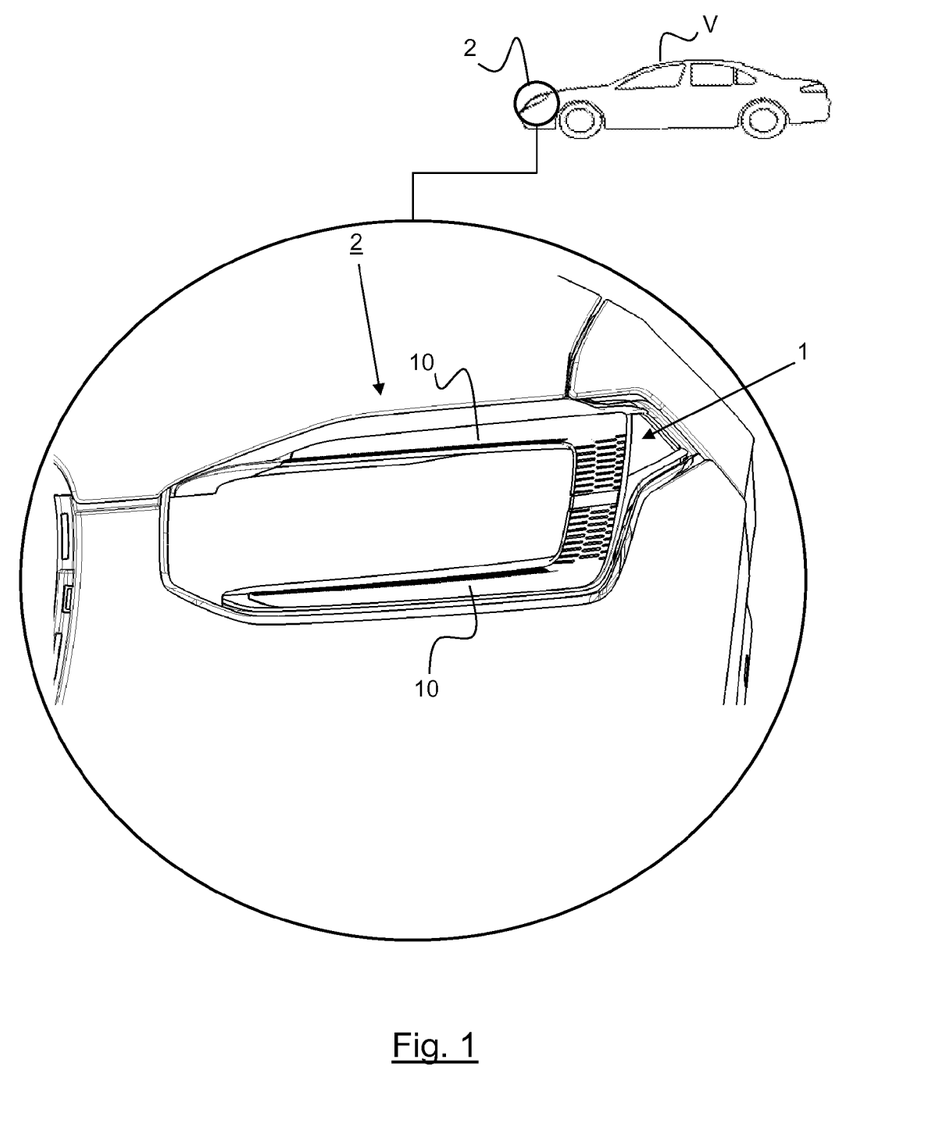
FIG. 1 represents a light module for a motor vehicle according to a nonlimiting embodiment of the invention, the light module comprising a light guide consisting of two branches.

The light module 1 for a motor vehicle V according to the invention is illustrated in FIG. 1. "Motor vehicle" should be understood to mean any type of motorized vehicle.

In the nonlimiting example of FIG. 1, a lighting device or headlight 2 of the motor vehicle V comprises the light module 1 and a plastic protective screen.

The light module 1 comprises a light guide 10 consisting of two branches which are distributed over a part of the boundary of the perimeter of the headlight 2.

Figure 2:
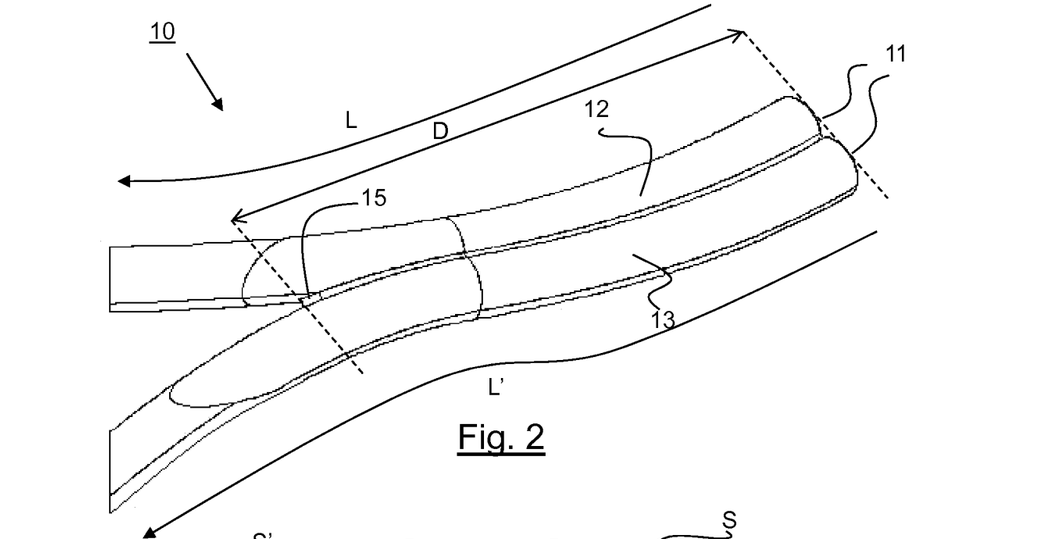
FIG. 2 represents a part of the light guide of FIG. 1 and its two branches according to a nonlimiting embodiment.

FIG. 2 illustrates a part of the light guide 10 according to a nonlimiting embodiment.

Figure 3:
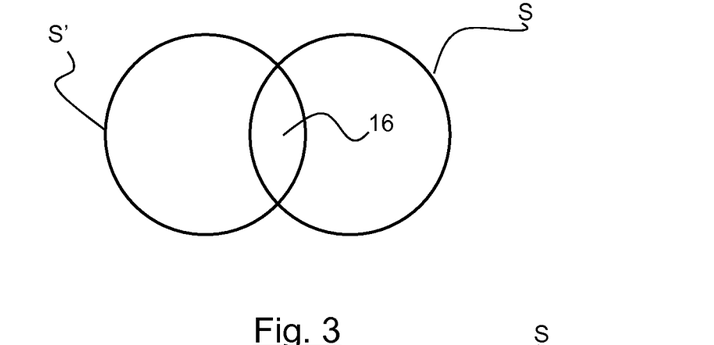
FIG. 3 is a diagram of a first nonlimiting embodiment of the sections of the branches of the light guide of FIG. 1, the sections overlapping along a zone of intersection.

The light guide 10 consists of an input face 11, two branches 12, 13 which each extend from the input face 11 according to a specific length L, L' and according to a specific section S, S' (FIG. 3).

In a nonlimiting embodiment, the branches 12 and 13 are produced in a material based on thermoplastic polymers PMMA (polymethylmethacrylate) or PC (polycarbonate).

As can be seen in FIG. 2, the two branches 12, 13 are contiguous over a part D of their length from the input face 11 to a determined point of separation 15. The two sections S, S' (illustrated in FIG. 3 or FIG. 4) of the two branches 12, 13 are substantially constant along the branches 12, 13 from the input face 11 over a length greater than or equal to the length of the branches 12, 13 between the input face 11 and the determined point of separation 15.

This makes it possible to obtain a determined point of separation 15 that is as small as possible. Thus, the presence of a light spot at this point is avoided and therefore leaks of light are avoided.

The light module 1 comprises at least one light source 14 (FIG. 5) arranged at the input face 11 of the light guide 10. In a nonlimiting embodiment the light module 1 comprises a plurality of light sources 14 arranged at the input face 11 of the light guide 10. This embodiment is taken as nonlimiting example hereinafter in the description.

The length of the part D is defined to:

allow for the mixing of the light rays emitted by the light sources 14. The length must not therefore be too small;

allow for a good mechanical strength of the light guide 10. The length must not therefore be too small for the light guide 10 not to break;

facilitate the production of the light guide 10, notably the material injection step.

In a nonlimiting example, the length of the part D is greater than or equal to 30 mm.

In a nonlimiting embodiment, the two sections S, S' are substantially constant over the entire length L, L' of the branches 12, 13. Thus, the fact that a section S, S' is equal at the input of the light guide 10 and at the output makes it possible to minimize the light flux losses. In effect, if the section S, S' decreases over the path of the light rays in the light guide 10, this generates photometric losses.

FIG. 3 schematically illustrates the two sections S and S' of the two branches 12 and 13. As can be seen, the two sections S, S' of the branches 12, 13 overlap over a zone of intersection 16 which is present from the input face 11 to the determined point of separation 15. The area of the zone of intersection 16 decreases continuously from the input face 11 to the determined point of separation 15. At the determined point of separation 15, the two sections S, S' are tangential.

Figure 4:
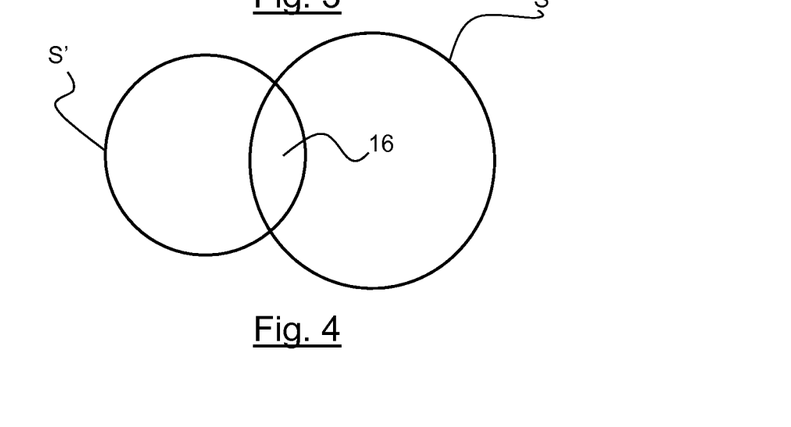
FIG. 4 is a diagram of a second nonlimiting embodiment of the sections of the branches of the light guide of FIG. 1, the sections overlapping along a zone of intersection.

In a first nonlimiting embodiment, the section S, S' of a branch 12, 13 is of circular form as illustrated in FIG. 3 or in FIG. 4.

In a second nonlimiting embodiment, the section S, S' of a branch 12, 13 is of square form (not illustrated).

In a third nonlimiting embodiment, the section S, S' of a branch 12, 13 is of oblong form (not illustrated).

In a first nonlimiting embodiment, the sections S, S' of the two branches 12, 13 have an identical form and have the same dimension. As illustrated in FIG. 3, the sections S, S' are of circular form and have the same dimension. The circles of the sections S, S' thus have the same radius and the same area.

In a second nonlimiting embodiment, the sections S, S' of the two branches 12, 13 have an identical form, but do not have the same dimension. As illustrated in FIG. 4, the sections S, S' are of circular form but have different dimensions, the area of the section S being greater than the area of the section S'.

In a third nonlimiting embodiment (not illustrated), the sections S, S' of the two branches 12, 13 are of different forms and have different dimensions.

When the two sections S and S' are of identical form, this facilitates the production of the light guide 10, notably for the material injection step. In particular, a circular form is simple to produce.

Thus, when the two sections S and S' have the same dimension, this makes it possible to obtain an iso-distribution of the light rays and of the colors in the two branches 12 and 13 of the light guide 10.

When the two sections S and S' have an identical form and have the same dimension, this makes it possible to obtain a total flux at the output of the light guide 10 which is optimal.

It will be noted that the circular form is a form which allows for a better propagation of the light rays in the two branches 12, 13 than the other forms.

Figure 5:
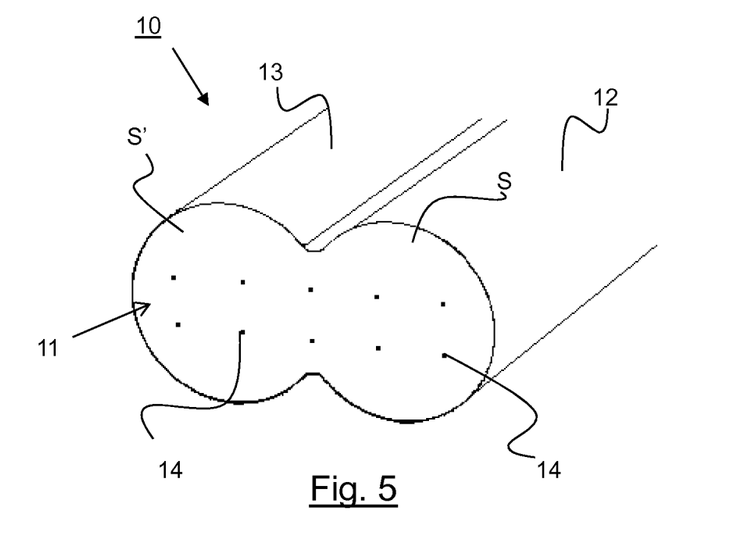
FIG. 5 is a perspective view of the input face of the light guide of FIG. 2.

FIG. 5 is an enlarged view of the input face 11 of the light guide 10.

As can be seen, the input face 11 is flat and is made up of the overall area of the sections S and S' of the two branches 12 and 13.

A plurality of light sources 14 is arranged at the input face 11 of the light guide 10, the input face 11 being adapted to couple the light rays emitted by the light sources 14 in the light guide 10. The light rays enter into the light guide 10 through the input face 11 and are propagated in the light guide 10 by total internal reflection on the walls of the two branches 12 and 13. It will be noted that there is a distance of a few millimeters between the light sources 14 and the input face 11. In a nonlimiting example, the distance is substantially equal to 0.3 mm. This distance makes it possible for the light sources 14 not to be subjected to the vibrations of the motor vehicle V, vibrations to which the headlight 2 of the motor vehicle V is subjected, while ensuring that a majority of the light emitted by the light sources 14 enters into the light guide 10. The light sources 14 thus do not risk being broken.

It will be noted that the light guide 10 further comprises decoupling elements (not illustrated) which make it possible to have the light rays exit on output faces (not illustrated) of the light guide 10. In a nonlimiting example, the decoupling elements are prisms.

In a nonlimiting embodiment, the light sources 14 are semiconductive emitting chips. In a nonlimiting variant, the chips are light-emitting diodes. Light-emitting diode should be understood to mean any type of light-emitting diode, be they, in nonlimiting examples, LED (Light-Emitting Diodes), OLED (Organic LED), AMOLED (Active-Matrix-Organic LED), or even FOLED (Flexible OLED).

Figure 6:
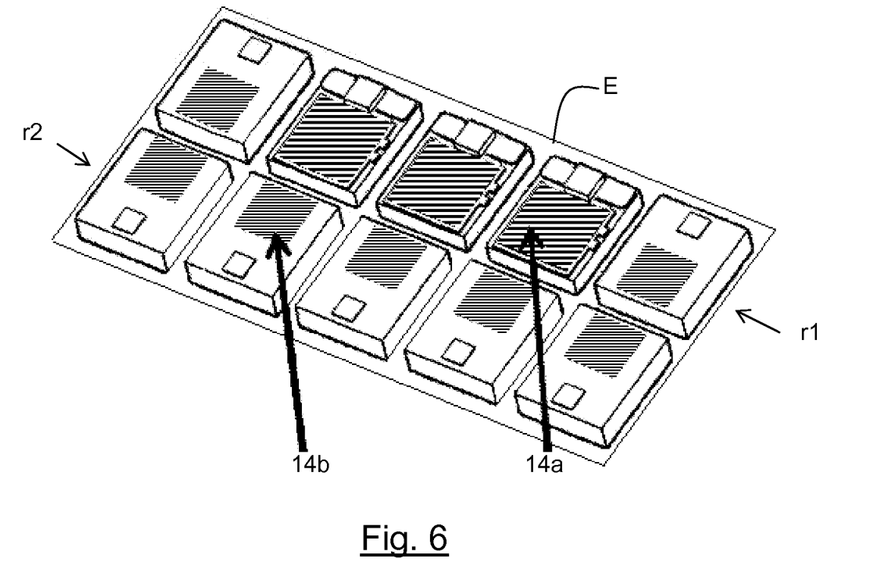
FIG. 6 is a perspective view of light sources of the light module of FIG. 1 arranged according to a nonlimiting embodiment.

FIG. 6 illustrates an arrangement of the light sources 14 according to a nonlimiting embodiment. It can be seen that the light sources 14 each comprise a housing of rectangular form. In a nonlimiting example, the light sources 14 have a size of 1 mm*1 mm and their housing a size of 2 mm*2 mm. According to this embodiment, the light sources 14 are arranged on two rows r1, r2, the light sources 14 of one row r1 being arranged head-to-tail with the light sources 14 of the other row r2. A compact arrangement of the light sources 14 is thus obtained.

This arrangement further makes it possible to bring the emitting zones of the light sources 14 as close as possible to one another and thus concentrate the light rays emitted more toward the center of the light guide 10. In effect, the emitting zones of the light sources 14 are not centered on the center of the housing but are slightly offset relative to the center.

It will be noted that a circular arrangement of the light sources 14 would take too much space relative to the sections S, S' of the light guide 10.

The light sources 14 are arranged on a common support (not illustrated). In a first nonlimiting example, the common support is a printed circuit board PCB. In a second nonlimiting example, the common support is a heat sink.

In a first nonlimiting embodiment, the light sources 14 comprise first sources 14a (broad cross-hatching) adapted to emit white light to produce a first photometric function and second sources 14b (thin cross-hatching) adapted to emit amber light to produce a second photometric function. In a nonlimiting example, the first photometric function is a DRL function to produce a daytime running light and the second photometric function is an ID function to produce a direction indicator function. In the example illustrated, there are thus three white light sources 14a and seven amber light sources 14b.

In the nonlimiting variant embodiment illustrated, the first sources 14a form a group of sources positioned substantially at the center of the input face 11 and edged on either side by the second sources 14b. This makes it possible to favor the light flux from the white light sources, since the light from the central light sources 14a is better collected by the light guide 10. Consequently, the central light sources 14a make it possible to produce a first photometric function exhibiting a light intensity greater than that of the second function produced by the outer light sources 14b, namely the amber light sources.

In a second nonlimiting embodiment, the first light sources 14a are adapted to emit white light to produce a third photometric function. In a nonlimiting example, the third function can be a PL function which produces a position light. For example, by electrically under powering these first sources 14a compared to the power supply required to produce the first photometric function, the PL function is produced.

It will be noted that, as illustrated in FIG. 6, the light sources 14 occupy a surface area E which is smaller than the surface area consisting of the two sections S, S' of the two branches 12, 13 such that the input face 11 collects a majority of the light rays emitted by the light sources 14. Thus, the area of the input face 11 and, consequently, the zone of intersection 16 of the two sections S, S' are dimensioned as a function of at least one, even all, of the following characteristics:

the arrangement of the light sources 14 at the input face 11 of the light guide 10;

the size of each light source 14;

the number of light sources 14.

Figure 8:
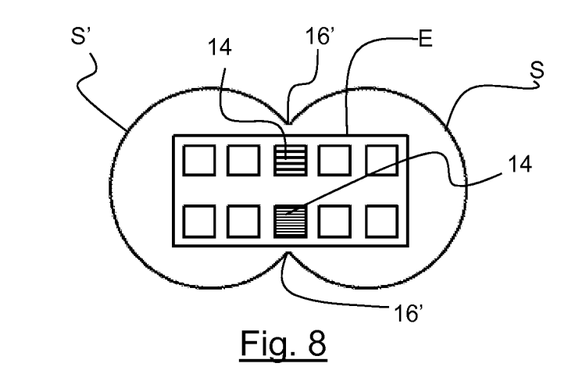
FIG. 8 illustrates a second diagram of the sections of the branches of the light guide at the input face and of the light sources of FIG. 6 arranged at the input face.

In the case where the zone of intersection 16 is too small as illustrated in FIG. 8, it comprises two very marked pinch points 16' between the two branches 12 and 13. At these pinch points 16', the light rays from the two light sources 14 which are cross-hatched in the figure will not be correctly collected by the light guide 10, some of the light rays will in effect not be collected because these two light sources 14 are too close to the pinch points 16'.

Figure 9:
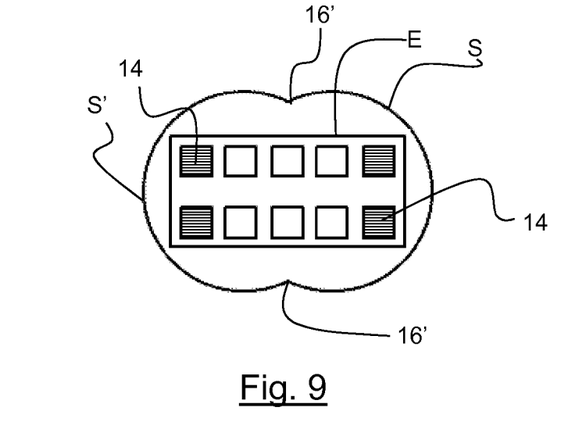
FIG. 9 illustrates a third diagram of the sections of the branches of the light guide at the input face and of the light sources of FIG. 6 arranged at the input face.

In the case where the zone of intersection 16 is too great as illustrated in FIG. 9, it comprises two pinch points 16' between the two branches 12 and 13 that are very little marked. At these pinch points 16', the light rays from the two light sources 14 are correctly collected by the light guide 10. By contrast, the light rays from the four light sources 14 which are cross-hatched in the figure and which are situated at the two ends of the two sections S and S' will not be correctly collected by the light guide 10. Some of the light rays will in effect not be collected, because these four light sources 14 are too close to the edges of the branches 12 and 13.

Figure 7:
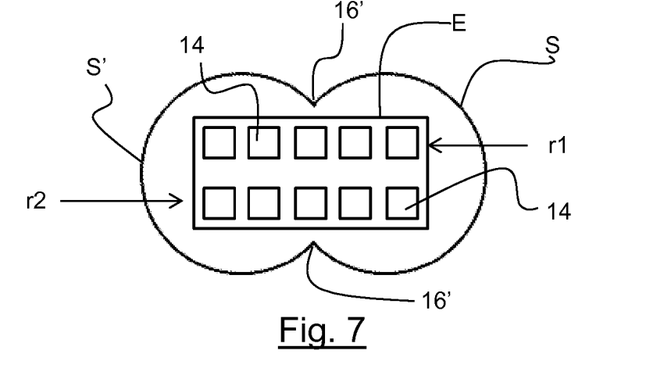
FIG. 7 illustrates a first diagram of the sections of the branches of the light guide of FIG. 5 at the input face and of the light sources of FIG. 6 arranged at the input face.

Thus, based on the characteristics cited previously, the good compromise for best coupling the light rays from all of the light sources 14 is the size of the zone of intersection 16 illustrated in FIG. 7.

Referring to FIGS. 10 to 15, another subject of the invention is a lighting device 2 for a motor vehicle V comprising a light module 1, the light module 1 comprising:

a light guide 10 consisting of an input face 11 and at least two branches 12, 13 each extending from the input face 11 according to a specific length L, L' and a specific section S, S';

a plurality of light sources 14 arranged at the input face 11 of the light guide 10, the input face 11 being adapted to couple the light rays emitted by the light sources 14 in the light guide 10, in which the light module 1 further comprises a printed circuit board 17, and in which the lighting device 2 further comprises a housing 18 comprising a front face 19 on which is arranged the light guide 10 and a rear face 20 on which is arranged the printed circuit board, the rear face 20 comprising:

centering tabs 201 for centering the light guide 10 in the housing; and centering ridges 203a, 203b, 203c and 203d for centering the printed circuit board 17 in the housing 18.

In a nonlimiting embodiment, the light module 1 is a light module according to the invention which has been described previously. Thus, the two branches 12, 13 are contiguous over a part D of their length from the input face 11 to a determined point of separation 15, the two sections S, S' of the branches 12, 13 overlapping over a zone of intersection 16 which is present from the input face 11 to the determined point of separation 15 and the two sections S, S' being substantially constant along the branches 12, 13 from the input face 11 over a length greater than or equal to the length of the branches 12, 13 between the input face 11 and the determined point of separation 15.

In a nonlimiting example, the lighting device 2 is a headlight.

Figure 10:
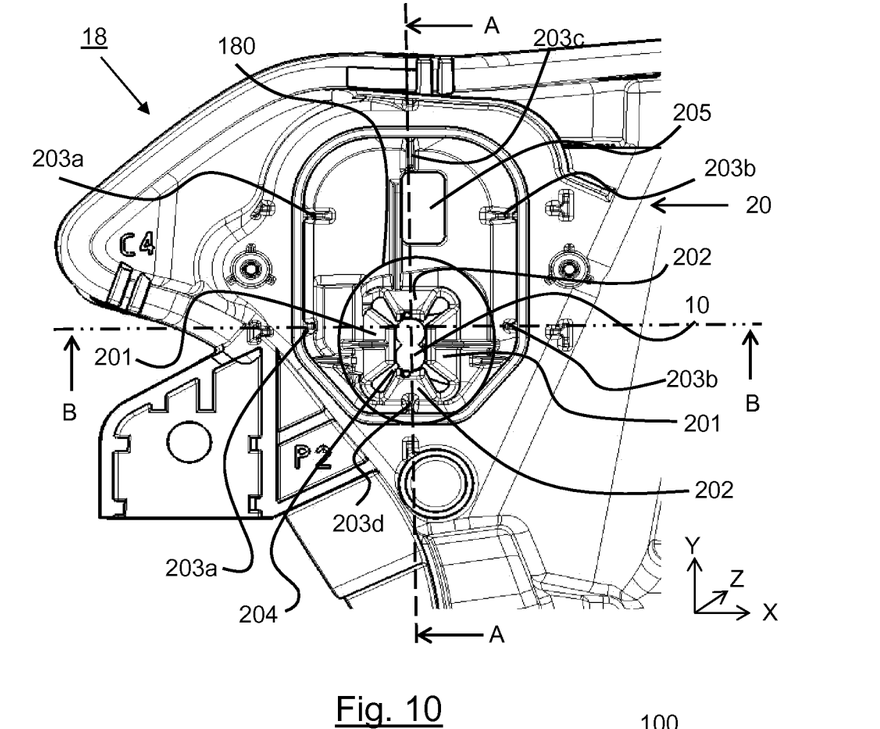
FIG. 10 is a view of a rear face of a housing of a lighting device of the motor vehicle, a housing in which are positioned the light guide of FIG. 2 and a printed circuit board.

FIG. 10 shows the rear face 20 of the housing 18 of the lighting device 2. The housing 18 comprises a conical form 180 which accommodates the light guide 10 and which makes it possible to locate the guide in Y and Z terms in the housing 18. The conical form 180 comprises an orifice 204 for receiving the light guide 10. Two centering tabs 201 are adapted to center the light guide 10 in the housing 18 according to the ordinate axis Y. The two centering tabs 201 are positioned facing one another. They are situated at the end of the conical form 180. They make it possible to center the two branches 12 and 13 of the light guide 10 at the same time, one tab extending over the length of the input face 11.

Moreover, six centering ridges 203a, 203b, 203c and 203d are adapted to center the printed circuit board 17 directly on the housing 18 in the directions X, Y and Z.

The six ridges 203a, 203b, 203c and 203d are positioned on the border of the housing 18. According to the arrangement illustrated in the nonlimiting example, two ridges 203a are positioned facing two other ridges 203b, and one ridge 203c is positioned facing another ridge 203d. This makes it possible to hold the printed circuit board 17 in position well.

Figure 12:
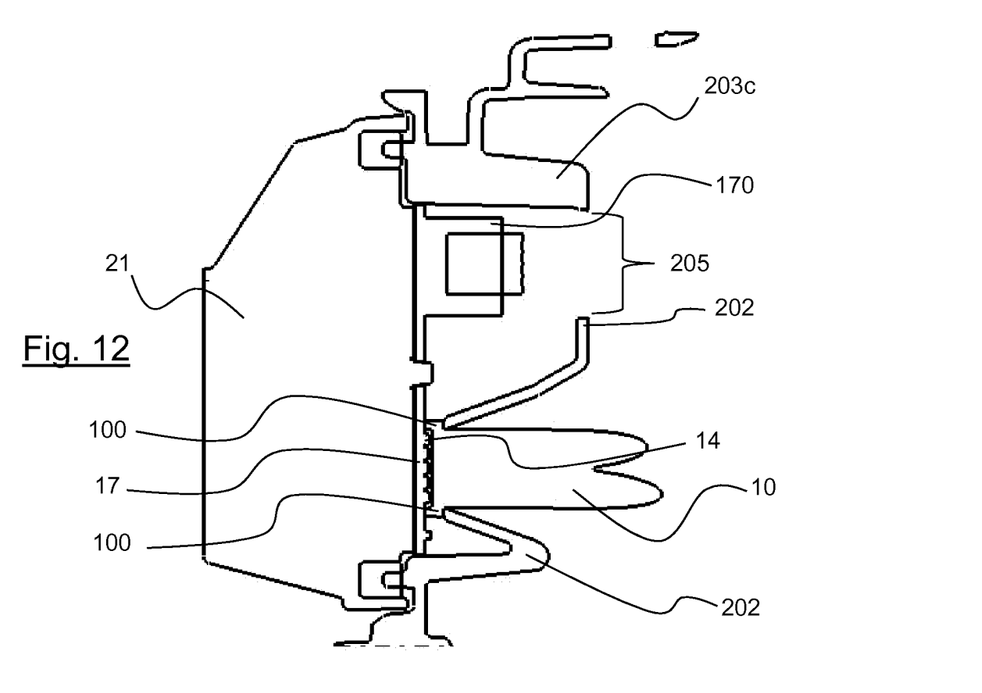
FIG. 12 is a first cross-sectional view of the housing of FIG. 10.

The rear face 20 also comprises an opening 205 facing which a connector 170 of the printed circuit board 17 comes to be positioned (illustrated in FIG. 12).

In a nonlimiting embodiment, the rear face 20 further comprises two fixing clips 202 for immobilizing the light guide 10 in the housing 18 and the light guide 10 comprises two lugs 100 which cooperate with the two fixing clips 202. The two fixing clips 202 are situated at the end of the conical form 180. They are facing one another and are flexible. They allow for the passage of the two lugs 100 of the light guide 10.

Figure 11:
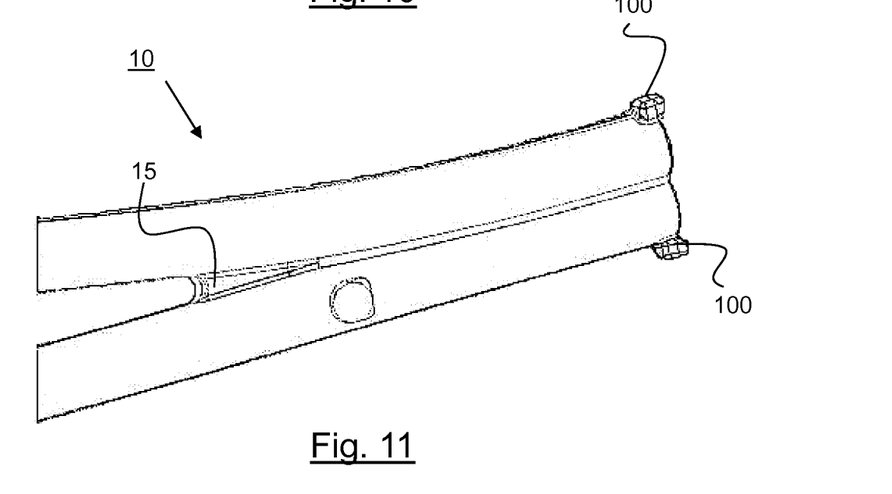
FIG. 11 represents a part of the light guide of FIG. 2 and its two branches, the light guide comprising two fixing lugs according to a nonlimiting embodiment.

The two lugs 100 of the light guide 10 are represented in FIG. 11. They are situated at the end of the light guide 10 on either side of the input face 11, each at the end of a branch 12 and 13. The size of these lugs 100 is minimized to the maximum to limit leaks of light and loss of flux.

FIG. 12 illustrates a view according to a vertical cross section A-A of the housing 18 on which are arranged the light guide 10 and the printed circuit board 17.

In the nonlimiting example illustrated, the printed circuit board 17 acts as a support for the light sources 14.

As can be seen, the light guide 10 is arranged on one side of the housing 18, while the board 17 is arranged on the other side. The two lugs 100 of the light guide 10 are inserted into the two fixing clips 202. The light guide 10 is thus fixed to the housing 18. The two lugs 100 are immobilized between the housing 18 and the printed circuit board 17 and are situated on either side of the light sources 14 of the board 17. They thus ensure the position and the fixing of the input face 11 of the light guide 10 at a determined distance from the light sources 14 of the printed circuit board 17. In a nonlimiting example, the two lugs 100 are configured such that the distance between the input face 11 and the light sources 14 is equal to 0.3 mm.

It will be noted that the fact that the light guide 10 is in contact with the printed circuit board 17 by means of the lugs 100 makes it possible to ensure a correct focusing of the light rays from the light sources 14 in the light guide 10.

As can be seen also in FIG. 12, the lighting device 2 further comprises a heat sink 21 arranged on the side of the rear face 20 of the housing 18, the printed circuit board 17 being placed between the rear face 20 and the heat sink 21. The heat sink 21 makes it possible to dissipate the heat given off by the light sources 14 and thus makes it possible to optimize their performance. It is external to the housing 18.

It will be noted that the light guide 10 is assembled first on the housing 18. For its part, the heat sink 21 is assembled on the printed circuit board 17. Then, the printed circuit board 17-heat sink 21 assembly is screwed onto the housing 18.

FIG. 12 also shows the connector 170 of the printed circuit board 17. The opening 205 produced in the housing 18 makes it possible for the connector 170 to be linked to a control and power supply unit for the light sources 14 (not illustrated).

Figure 13:
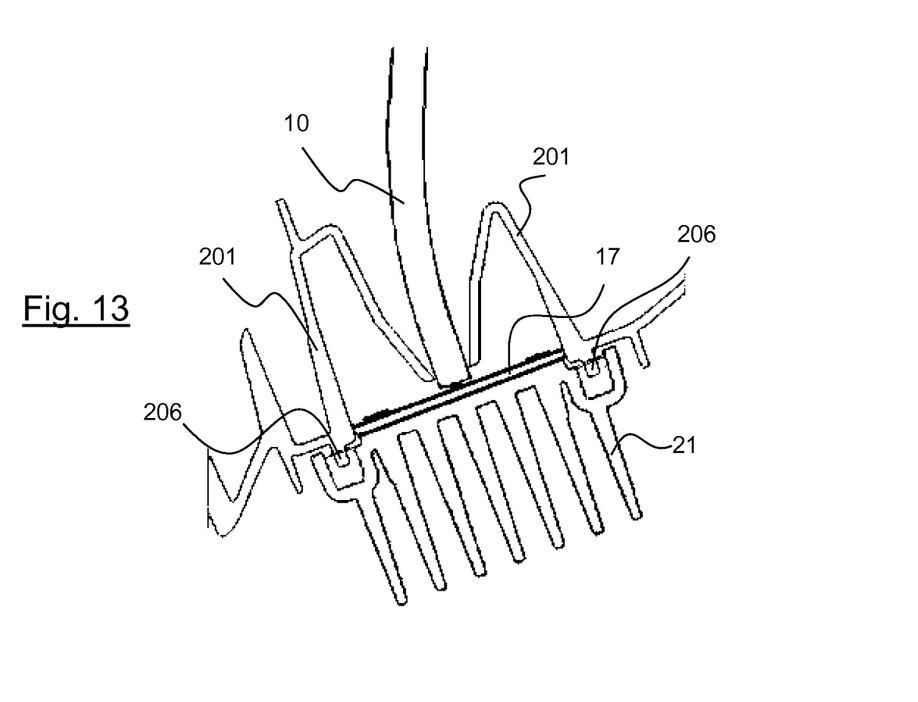
FIG. 13 is a second cross-sectional view of the housing of FIG. 10.

FIG. 13 illustrates a view according to a horizontal cross section B-B of the housing 18. The two centering tabs 201 and the two tabs 206 of the housing 18 are illustrated. The two tabs 206 are embedded in a seal of the housing 18 and the heat sink 21 rests on the tabs 206. This makes it possible to resolve any problems of seal-tightness of the housing 18.

Figure 14:
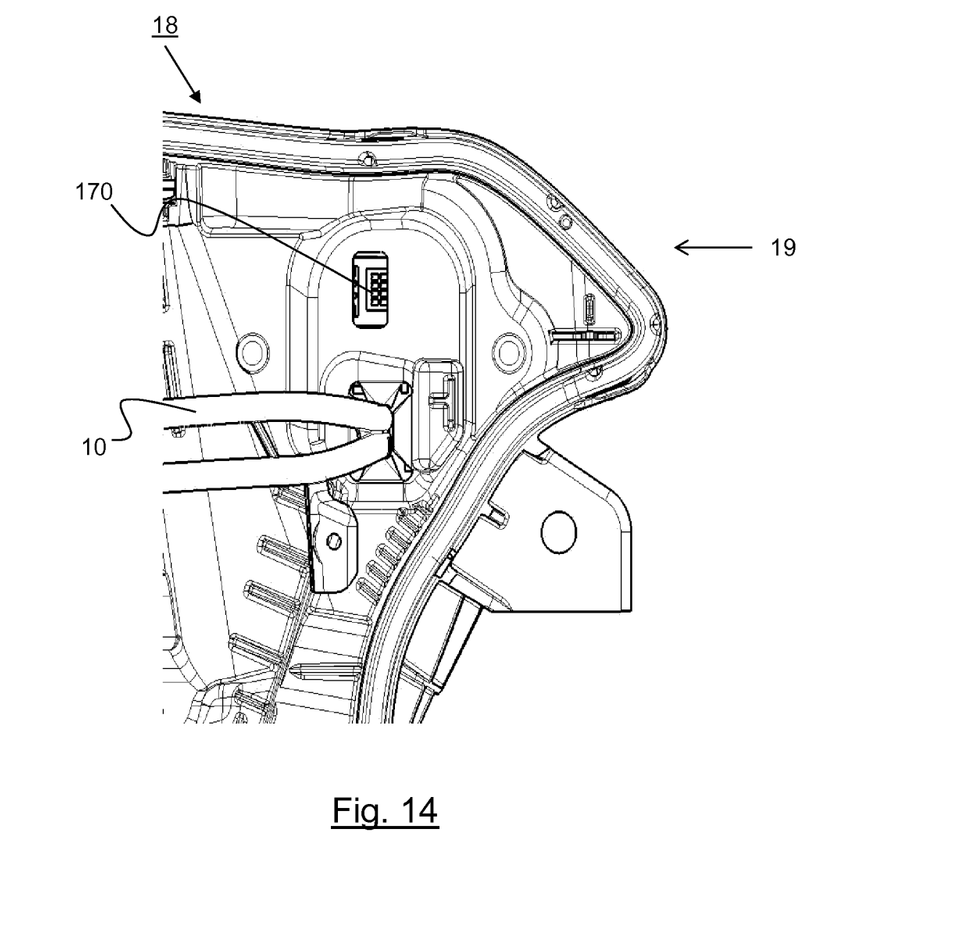
FIG. 14 is a view of a front face of the housing of FIG. 10.

FIG. 14 shows the front face 19 of the housing 18 of the lighting device 2. As can be seen, the input face 11 of the light guide 10 is positioned in the orifice 204 of the housing 18 provided for this purpose and the connector 170 is located facing the opening 205 of the housing 18.

Thus, by using the housing 18, the use of a ribbon cable at the input to link two light guides 10 is avoided. The problems of loss of flux at the input of the light guides 10 (here the two branches 12 and 13) no longer apply, and moreover, there is no problem of injection as is the case with a ribbon cable. In effect, a ribbon cable is difficult to produce because it is of very small thickness compared to the associated light guides 10.

Obviously, the description of the invention is not limited to the embodiments described above.

Thus, in a nonlimiting embodiment, the sections S, S' are not constant over the entire length L, L' of the branches 12, 13. For example, after the point of separation 15, each section S, S' decreases or increases in the same way or not.

Thus, the invention described notably offers the following advantages:

the two contiguous branches 12 and 13 make it possible to produce two light guides secured as a single piece: a double light guide is thus obtained;

the two branches 12 and 13 of the light guide make it possible to distribute the light flux over the boundary of the perimeter of the headlight according to the demand of the customer;

the light flux increases significantly compared to a solution with two separate guides (with or without ribbon cable) and compared to a solution where the section changes form (for example an oblong form at the input of the guide then a circular form after the point of separation);

the constant section of branches makes it possible to have a reduced point of separation and consequently significantly reduce the leaks of light at this point. The lit appearance of the light guide is thus enhanced. An observer of the headlight therefore no longer sees leaks of light at the point of separation unlike a solution where the section changes form (for example an oblong form at the input of the guide then a circular form after the point of separation) and where the point of separation comprises a lot of injected material;

a single printed circuit board makes it possible to combine all the light sources at the input face of the light guide: the distribution of the light flux is thus homogeneous as is the mixing of the colors, unlike a solution with two separate guides which requires the light sources to be separated;

the input face of the guide is designed by keeping the outline of the two branches so as to minimize the photometric losses at the input and the leaks of light at the separation of the branches and ensure a good mixing of the colors and an identical flux distribution in each branch, unlike a solution in which a light guide comprises two branches of circular form after the point of separation and a single branch of oblong form before the point of separation. In this prior art solution, the area of the section is significant at the input of the guide to be able to place the light sources then the area of the section decreases which results in losses of light flux;

a flexible number of light sources can be used unlike a solution with two separate guides (with or without ribbon cable) which can use only an even number of light sources. This thus adds a whole level of flexibility to the desired light flux level and the intensity of light that is to be obtained;

a single tool is used to perform the material injection to obtain the light guide according to the invention, unlike a solution with two separate guides (with or without ribbon cable) which requires two different tools for the material injection;

the material injection is facilitated because there is no longer a ribbon cable at the end of the light guide. There is a better filling of the light guide during the injection;

since the light guide is a piece of homogeneous form and of a thickness that is not small, the plastic risk such as a sunk spot is less. It will be recalled that a sunk spot is a deformation of the part after molding, in particular the part shrinks;

there is no longer any problem during the material injection unlike a solution with two light guides which rejoin at the input of the guide with an oblong form and separate with a circular form, the latter solution requiring a significant injection of material at the point of separation; and the assembly of the light guide in the housing is simple and easy.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A light module for a motor vehicle (V) consisting of:
a light guide consisting of an input face and at least two branches each extending from said input face according to a specific length (L, L') and a specific section (S, S');
at least one light source arranged at said input face of said light guide, said input face being adapted to couple the light rays emitted by said at least one light source in said light guide;
in which said at least two branches are contiguous over a part (D) of their length from said input face to a determined point of separation, said sections (S, S') of said at least two branches overlapping over a zone of intersection which is present from said input face to said determined point of separation and said sections (S, S') being substantially constant along said at least two branches from said input face over a length greater than or equal to a length of said at least two branches between said input face and said determined point of separation;
in which an area of said zone of intersection decreases continuously from said input face to said determined point of separation.

2. The light module according to claim 1, in which said sections (S, S') are substantially constant over the entirety of said length (L, L') of said at least two branches.

3. The light module according to claim 1, in which said sections (S, S') of said at least two branches are tangential at said determined point of separation.

4. The light module according to claim 1, in which said sections (S, S') of said at least two branches have an identical form.

5. Light module according to claim 1, in which said sections (S, S') of said at least two branches have the same dimension.

6. The light module according to claim 1, in which said light module comprises a plurality of light sources arranged at said input face of said light guide.

7. The light module according to claim 6, in which said zone of intersection of said sections (S, S') is dimensioned as a function of at least one of the following characteristics:

the arrangement of said plurality of light sources at said input face of said light guide;

the size of each of said plurality of light sources;

the number of said plurality of light sources.

8. The light module according to claim 6, in which said plurality of light sources occupy a surface area (E) which is smaller than a surface area consisting of said sections (S, S') of said at least two branches such that said input face collects all the light rays emitted by said plurality of light sources.

9. The light module according to claim 6, in which said plurality of light sources are arranged on two rows (r1, r2), said plurality of light sources of one row (r1) being arranged head-to-tail with said plurality of light sources of the other row (r2).

10. The light module according to claim 6, in which said plurality of light sources comprise first sources suitable for emitting white light to produce a first photometric function and second sources suitable for emitting amber light to produce a second photometric function.

11. The light module according to claim 10, in which said first sources form a group of sources positioned substantially at a center of said input face and edged on either side by said second sources.

12. A lighting device for a motor vehicle (V) comprising a light module according to claim 1, in which said light module further comprises a printed circuit board, and in which said lighting device further comprises a housing comprising a front face on which is arranged said light guide and a rear face on which is arranged said printed circuit board, said rear face comprising:

centering tabs for centering said light guide in said housing; and centering ridges for centering said printed circuit board in said housing.

13. The lighting device according to claim 2, in which said rear face further comprises two fixing clips for immobilizing said light guide in said housing and said light guide comprises two lugs which cooperate with said two fixing clips.

14. The lighting device according to claim 12, in which said lighting device further comprises a heat sink arranged on a side of said rear face of said housing, said printed circuit board being placed between said rear face and said heat sink.

15. A light module for a motor vehicle (V) consisting of:

a light guide consisting of an input face and at least two branches each extending from said input face according to a specific length (L, L') and a specific section (S, S');

at least one light source arranged at said input face of said light guide, said input face being adapted to couple the light rays emitted by said at least one light source in said light guide;

in which said at least two branches are contiguous over a part (D) of their length from said input face to a determined point of separation, said sections (S, S') of said at least two branches overlapping over a zone of intersection which is present from said input face to said determined point of separation and said sections (S, S') being substantially constant along said at least two branches from said input face over a length greater than or equal to a length of said at least two branches between said input face and said determined point of separation;

in which said sections (S, S') are substantially constant over the entirety of said length (L, L') of said at least two branches;

in which an area of said zone of intersection decreases continuously from said input face to said determined point of separation.

16. The light module according to claim 2, in which said sections (S, S') of said at least two branches are tangential at said determined point of separation.

17. Light module according to claim 2, in which said sections (S, S') of said at least two branches have the same dimension.

18. Light module according to claim 1, in which said sections (S, S') of said at least two branches have the same dimension.

19. The light module according to claim 2, in which said sections (S, S') of said at least two branches have an identical form.

20. The light module according to claim 2, in which said light module comprises a plurality of light sources arranged at said input face of said light guide.

* * * * *